3,405,126
4-HYDROXY-7-AMINO-3-SULFANYLAMIDE-
COUMARIN
Hisashi Ichibagase and Masataka Ichikawa, Kumamoto-shi, and Senkichi Nagasaki, Tokyo, Japan, assignors to Daiichi Seiyaku Company Limited, Tokyo, Japan, a corporation of Japan
No Drawing. Filed Jan. 5, 1966, Ser. No. 518,775
Claims priority, application Japan, Jan. 11, 1965, 40/1,086
1 Claim. (Cl. 260—239.6)

ABSTRACT OF THE DISCLOSURE

The novel compound 4-hydroxy-7-amino-3-sulfanylamide-coumarin can be prepared by nitrating 4-hydroxy-7-acetamido-coumarin with nitric acid in glacial acetic acid to give 3-nitro-4-hydroxy-7-acetamido-coumarin; hydrogenating catalytically the resulting compound to afford 3-amino-4-hydroxy-7-acetamido-coumarin; condensing the latter compound with p-acetylamino-benzenesulfonyl chloride to produce 4-hydroxy-7-acetamido-3-($N^4$-acetylsulfanylamide)-coumarin; and finally hydrolyzing thus obtained compound.

---

The present invention relates to a new sulfonamide more particularly to 4-hydroxy-7-amino-3-sulfanfylamide-coumarin of the formula:

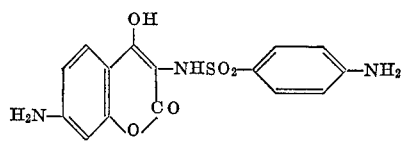

and methods of preparing same.

Heretofore there have been neither sulfonamides having a sulfanylamide group in the $C_3$-position of an amino-coumarin ring nor sulfonamides having 4-hydroxy-coumarin as their basic structure.

4-hydroxy-7-amino-3-sulfanylamide-coumarin of the present invention is effective against various kinds of bacteria, in particular, the minimum growth-inhibiting concentration of Mycobacterium tuberculosis cultivated at 37° C. for 3 weeks is 6.3 γ/cc., this being superior to sulfisoxazole whose minimum inhibitory concentration is 50 γ/cc. under the same condition. The acute toxicity of the sulfonamide of the present invention by oral administration in mice is very weak, that is, $LD_{50}$ is more than 2 g./kg. body weight.

The process in accordance with the present invention may be illustrated by the following equation:

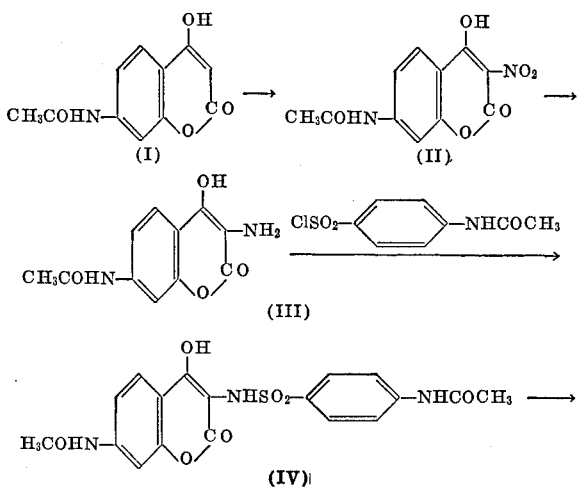

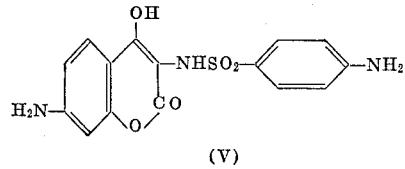

That is, the process of the present invention comprises nitrating 4-hydroxy-7-acetamido-coumarin (I) with nitric acid in glacial acetic acid to give 3-nitro-4-hydroxy-7-acetamido-coumarin (II); hydrogenating catalytically the resulting compound to afford 3-amino-4-hydroxy-7-acetamido-coumarin (III); condensing the latter compound with p-acetylamino-benzenesulfonyl chloride to produce 4-hydroxy-7-acetamido-3 - ($N^4$-acetylsulfanylamide) - coumarin (IV); and finally hydrolyzing thus obtained compound to give 4-hydroxy-7-amino-3-sulfanylamide-coumarin (V).

The present invention will be explained in detail by the following description. When 4-hydroxy-7-acetamido-coumarin (I) is heated with nitric acid in glacial acetic acid at a temperature of between 80° C. and 85° C., a good yield of mononitro compound is obtained. Since this compound is converted to p-aminosalicylic acid when decomposed with a concentrated alkali solution, the compound proved to be 3-nitro-4-hydroxy-7-acetamido-coumarin (II) having a nitro group in the $C_3$-position of the coumarin nucleus. A good yield of the compound (III) is easily obtained by hydrogenating catalytically the compound (II) in an aliphatic lower alcohol such as methanol or ethanol with the addition of hydrochloric acid, or in an aqueous solution of an alkali such as sodium bicarbonate, in the presence of a catalyst, for example, palladium-charcoal. The compound (IV) is obtained when p-acetylamino-benzenesulfonyl chloride is reacted with the compound (III) in a solvent selected from the group consisting of pyridine and an aqueous solution of an alkali such as alkali hydroxide, alkali carbonate, or alkali bicarbonate. The reaction in an aqueous solution of an alkali proceeds at room temperature, while that in pyridine proceeds by heating at a temperature of between 80° C. and 85° C. It was found that the reaction in an aqueous solution of an alkali is shorter in the reaction time and provides a higher yield as compared with that in pyridine. The desired compound (V) is obtained by the hydrolysis of the compound (IV) with hydrochloric acid in an aliphatic lower alcohol or with an aqueous solution of an alkali such as alkali hydroxide or alkali carbonate.

The starting material (I) of the present invention can be synthesized according to the following course of reactions:

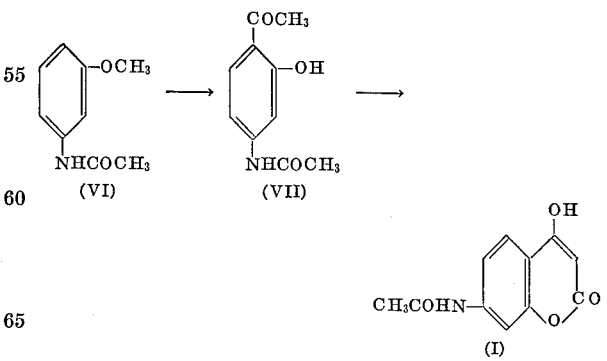

2-hydroxy-4-acetamido-acetophenone (VII) is synthesized by the reaction of N-acetyl-m-anisidine (VI) with acetyl chloride in the presence of anhydrous aluminum chloride. As a solvent for the reaction, C. S. Gibson et al. employed carbon disulfide [(Journal of the Chemical Society), vol.

134, page 2388 (1931)] and M. Julia utilized ethylene chloride (Chemical Abstracts, vol. 46, page 8052). It has been found that the latter solvent provides a better result. As a process for the synthesis of the compound (I) there exists the M. Julia's method [Chemisches Zentralblatt, vol. 126, page 3141 (1955)]. According to this method, the compound (I) was reportedly obtained in a yield of 64% with ring-closure by refluxing the compound (VII) with diethyl carbonate for 4 hours in the presence of sodium. However, the inventors obtained only a yield of less than 30% under the same reaction conditions of the reaction. The reasons being firstly, for the reaction temperature, the boiling point of diethyl carbonate used also as a solvent was insufficient and, a large excess of diethyl carbonate made the elevation of the reaction temperature difficult, thus decreasing the yield. On the other hand, when diethyl carbonate in an amount of corresponding moles to the compound (VII) were used, the reaction mixture became viscous, forming a resin. Therefore, it was found that the ratio of 8–10 parts of diethyl carbonate per one part of the compound (VII) was suitable and that the temperature of a heating bath should be between 180° C. and 200° C. Moreover, from the fact that the reaction was most vigorous during the first 3 to 4 hours, making the whole material solid, the conventional reaction time of 4 hours was insufficient, but about 8 hours were necessary. As described above, by examining the reaction conditions, it was possible to increase the yield of the compound (I) over that of the conventional method.

The process in accordance with the present invention is illustrated by the following examples.

EXAMPLE 1

(1) 3-nitro-4-hydroxy-7-acetamido-coumarin (II)

To 5 ml. of glacial acetic acid was added 1 g. of 4-hydroxy-7-acetamido-coumarin and to this mixture was gradually added a mixture of 1 ml. of nitric acid (specific gravity: 1.38) and 1 ml. of glacial acetic acid and the whole mixture was heated at a temperature of between 80° C. and 85° C. Immediately after reaching the said temperature the nitration took place with heat generation and bubbling. The reaction temperature should be kept below 90° C. After allowing the reaction mixture to stand for nearly one hour, the separated crystals were filtered by suction, washed with a small amount of glacial acetic acid, next with water, and recrystallized from ethanol to give light yellow plate-needles of 3-nitro-4-hydroxy-7-acetamido-coumarin, M.P. 245–247° C., yield 1 g. (83%).

Elementary analysis.—Calculated for $C_{11}H_8O_6N_2$: C, 50.00%; H, 3.05%; N, 10.60%. Experimental: C, 49.90%; H, 3.38%; N, 10.73%.

0.3 g. of thus obtained compound was refluxed with 20 ml. of 16% aqueous solution of sodium hydroxide for 6 hours. The reaction mixture was diluted with water, made weakly acidic with hydrochloric acid, and then neutralized with aqueous ammonia and glacial acetic acid to give p-aminosalicylic acid. From the above fact, it was confirmed that the position of the substitution was the $C_3$.

The starting material of the present invention, 4-hydroxy-7-acetamido-coumarin is a known compound, but it was synthesized by the following improved method.

To 50 ml. of diethyl carbonate was added 6 g. of 2-hydroxy-4-acetamido-acetophenone (M.P. 138° C.–142° C.) and to this mixture was added 5 g. of metallic sodium. The whole mixture was heated at a temperature of between 180° C. and 200° C. for about 8 hours, during which period the reaction was most vigorous in the first 3 to 4 hours and the reaction mixture was solidified with heat generation and fuming. Heating was continued while destroying the mass and sometimes with stirring. After the reaction was completed the solid material was filtered by suction, the unreacted sodium was dissolved with 20 ml. of methanol. Then the solid material was dissolved with the addition of 200 ml. of water and the insoluble substance was removed by filtration. The filtrate was acidified with hydrochloric acid and the precipitate formed was filtered by suction, washed with water and dried. The precipitate was recrystallized from ethanol to give light yellow needles of 4-hydroxy-7-acetamido-coumarin, M.P. over 300° C., yield 5 g. (80%).

(2) 3-amino-4-hydroxy-7-acetamido-coumarin (III)

(A) In 400 ml. of hot ethanol was dissolved 1 g. of 3-nitro-4-hydroxy-1-acetamido-coumarin and to the solution was added 0.5 ml. of concentrated hydrochloric acid and 2 g. of palladium-charcoal as a catalyst. Catalytic reduction was carried out at room temperature. In about an hour the absorption of hydrogen ceased after the calculated amount of hydrogen had been consumed. Then the precipitated hydrochloric acid salt was dissolved by refluxing the mixture for 20 minutes and the solvent was removed under reduced pressure after filtration.

To the residue was added 20 ml. of water and the mixture was dissolved by being made alkaline with aqueous ammonia. The solution was made acidic with the addition of glacial acetic acid. The precipitate formed was filtered, washed with water, dried, and recrystallized from acetone to give light yellow needles of 3-amino-4-hydroxy-7-acetamido-coumarin, M.P. 235° C.–237° C. (with decomposition), yield 0.7 g. (80%).

Elementary analysis.—Calculated for $C_{11}H_{10}O_4N_2$: C, 56.41%; H, 4.30%; N, 11.96%. Experimental: C, 56.33%; H, 4.51%; N, 11.97%.

(B) In 100 ml. of 1.5% aqueous solution of sodium bicarbonate was dissolved 3.5 g. of 3-nitro-4-hydroxy-7-acetamido-coumarin at room temperature and reduction was carried out at room temperature in the presence of 2 g. of palladium-charcoal as a catalyst. The absorption of hydrogen ceased in about 2 hours after the calculated amount of hydrogen had been consumed. After the reaction was completed 20 ml. of 10% aqueous solution of sodium hydroxide was added and the catalyst was filtered off with sufficient agitation. The pH of the filtrate was adjusted to 6 with hydrochloric acid, the precipitate formed was filtered by suction, washed and dried. Then the same treatment as in (A) gave 3-amino-4-hydroxy-7-acetamido-coumarin, yield 2.5 g. (80%).

(3) 4-hydroxy-7-acetamido-3-($N^4$-acetylsulfanylamide)-coumarin (IV)

(A) In 40 ml. of 10% aqueous solution of sodium carbonate was dissolved 1 g. of 3-amino-4-hydroxy-7-acetamido-coumarin at room temperature. A solution of 1.2 g. of p-acetylaminobenzenesulfonyl chloride in 6 ml. of acetone was added dropwise thereto over a period of about 20 minutes under agitation, and the agitation was further continued for 3 hours. After the reaction was completed the reaction mixture was made acidic with hydrochloric acid and the precipitate formed was filtered by suction, washed with water, dried, and recrystallized from a mixture of methanol and benzene (1:3) to give white needles of 4-hydroxy-7-acetamido-3-($N^4$-acetylsulfanylamide)-coumarin, M.P. 230° C.–231° C. (with decomposition), yield 1.5 g. (83%).

Elementary analysis.—Calculated for $C_{19}H_{17}O_7N_3S$: C, 52.89%; H, 3.97%; N, 9.74%. Experimental: C, 53.21%; H, 4.15%; N, 9.54%.

(B) In 20 ml. of pyridine was suspended 2.5 g. of 3-amino-4-hydroxy-7-acetamido-coumarin. A solution of 2.6 g. of p-acetylaminobenzenesulfonyl chloride in 10 ml. of pyridine was added thereto and the mixture was heated at a temperature of between 80° C. and 90° C. on a water-bath for 3 hours. After the reaction was completed the reaction mixture was allowed to stand overnight. The mixture was mixed with 300 ml. of water, distilled under reduced pressure. A resin-like substance formed was filtered off when the distillate reached about 40 ml. and the filtrate was further distilled under reduced pressure. The residue was extracted with 20 ml. of 5% aqueous solution of sodium hydroxide at room temperature, the extract was made acidic with hydrochloric acid and the precipitate formed was filtered by suction, washed and dried. Then, the same treatment as in (A) gave 4-hydroxy-7-acetamido-3-($N^4$-acetylsulfanylamide)-coumarin, yield 2 g. (43%).

(4) 4-hydroxy-7-amino-3-sulfanylamide-coumarin (V)

In a mixture of 7 ml. of concentrated hydrochloric acid and 7 ml. of ethanol was suspended 2 g. of 4-hydroxy-7-acetamido-3-($N^4$-acetylsulfanylamide)-coumarin and the mixture was heated on a waterbath for 2 hours, during which period the crystals were once dissolved and then the hydrochloric acid salt began to separate gradually. After evaporation of ethanol 10 ml. of water was added and the mixture was made alkaline with a 10% aqueous solution of sodium hydroxide to dissolve the residue. The pH of the solution was adjusted to 3–4 with hydrochloric acid and the precipitate formed was filtered by suction, washed with water, dried, and recrystallized from methanol to give light yellow needles of 4-hydroxy-7-amino-3-sulfanylamide-coumarin monohydrate, M.P. 207° C.

*Elementary analysis.*—Calculated for $$C_{15}H_{13}O_5N_2S \cdot H_2O$$

C, 49.31%; H, 4.11%; N, 11.50%. Experimental: C, 49.63%; H, 3.90%; N, 11.82%.

This compound, when dried at 140° C. for 4 hours under reduced pressure, gave brown needles which blackened at 205° C.–207° C., giving anhydride, M.P. over 300° C.

*Elementary analysis.*—Calculated for $C_{15}H_{13}O_5N_3S$: C, 51.86%; H, 3.77%; N, 12.09%. Experimental: C, 51.54%; H, 3.90%; N, 11.96%.

What we claim is:
1. 4 - hydroxy - 7 - amino - 3 - sulfanylamide - coumarin of the formula:

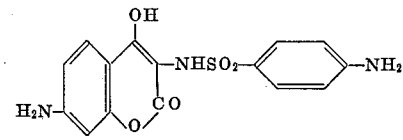

References Cited

Reppel et al.: Arch. Pharm., vol. 296, pp. 365–69 (1963).

Reppel et al.: Arch. Pharm., vol. 297, pp. 711–18 (1964).

Degering: An Outline of Organic Nitrogen Compounds, pp. 130–131 (1945), 4th ed.

HENRY R. JILES, *Primary Examiner.*

H. I. MOATZ, *Assistant Examiner.*